Patented May 21, 1935

2,002,084

UNITED STATES PATENT OFFICE 2,002,084

MANUFACTURE OF ALIPHATIC ANHYDRIDES

Henry Dreyfus, London, England

No Drawing. Application October 28, 1932, Serial No. 640,003. In Great Britain December 31, 1931

14 Claims. (Cl. 260—123)

This invention relates to the manufacture of aliphatic anhydrides by the thermal decomposition of aliphatic acids, and especially to the manufacture of acetic anhydride by the thermal decomposition of acetic acid.

I have found that compounds containing a plurality of metals, one or more of which is at least as electronegative as barium, combined with a radicle of a phosphoric acid, are highly useful catalysts for promoting the thermal decomposition of aliphatic acids into their anhydrides. The said compounds may contain each of the metals in the form of basic radicles, i. e. compounds which are polymetallic salts of phosphoric acids, or one or more of the metals may be present in the form of an acid radicle. Each of the metals present in the compounds may be at least as electronegative as barium, or the compounds may contain more electropositive metals as well as metals at least as electronegative as barium.

The following may be mentioned as instances of compounds that are very useful for the purposes of the invention:—potassium barium orthophosphate, potassium barium di-, tri-, or tetra-meta-phosphates, sodium barium orthophosphate, sodium barium di-, tri-, or tetra-meta-phosphates, potassium strontium orthophosphate, potassium strontium pyrophosphate, potassium strontium di- or hexametaphosphates, sodium strontium orthophosphate, sodium strontium pyrophosphate, sodium strontium di- or trimetaphosphates, potassium calcium orthophosphate, potassium calcium pyrophosphate, potassium calcium di-metaphosphate, sodium calcium orthophosphates, sodium calcium pyrophosphates, sodium calcium di-, tri- or hexametaphosphates, potassium magnesium orthophosphate, potassium magnesium di-metaphosphates, sodium magnesium ortho- or pyrophosphates, trisodium magnesium tri-phosphate, sodium magnesium di-, tri- or octa-metaphosphates, potassium aluminium orthophosphates, potassium aluminium pyrophosphates, purpureo or leuteo potassium vanadium phosphates, potassium antimony phosphotungstate, calcium aluminium phosphates, magnesium aluminium phosphate, barium aluminium phosphotungstate, calcium phosphotungstates, barium phosphomolybdates, magnesium nickel orthophosphate, nickel phosphomolybdates, zinc nickel phosphate, cobalt phosphomolybdates, zinc cobalt phosphate, copper phosphotungstate.

The compounds of the invention may be employed as sole catalysts, or may be employed in conjunction or association with other catalysts capable of promoting the thermal decomposition of aliphatic acids into their anhydrides.

Whilst the compounds of the invention may be employed in their forms containing water of crystallization, it is preferable to employ compounds free or substantially free from water of crystallization or compounds which have been previously heated to expel water of crystallization. Moreover, by previously heating many of the compounds, especially mono- or di-metaphosphates, complex poly-metaphosphates can be produced which are highly suitable for the purposes of the invention.

The thermal decomposition of the aliphatic acids may be performed in any convenient way. For instance, the aliphatic acid vapor may be passed in a stream through heated liquid or molten baths consisting of or containing one or more of the compounds of the invention. The molten baths may, if desired, contain salts or other substances of low or relatively low melting point which may dissolve or hold in suspension the compounds of the invention for instance in cases where the compounds themselves are not molten at the temperatures employed. As instances of such salts or substances may be mentioned low melting mixtures of sodium chloride and potassium chloride or magnesium chloride, calcium chloride and magnesium chloride or barium chloride, or metals or alloys of low melting point such as lead or tellurium, alloys thereof, or other low melting alloys.

Alternatively, the aliphatic acid vapors may be passed in a stream over one or more of the compounds of the invention contained in tubes or other convenient apparatus and heated to the desired temperature. Thus the compounds may, if desired, be employed deposited upon or mixed with carriers or filling materials, and may, if desired, be employed in conjunction or in admixture with other catalysts capable of promoting the thermal decomposition of aliphatic acids into their anhydrides.

In yet another form of the invention the aliphatic acids in liquid form and containing the compounds of the invention may be injected or sprayed into heated reaction zones; very small quantities of the compounds can usefully be employed according to this method. For instance, acetic acid or other aliphatic acid containing such small quantities as about ¼ to 2% of one or more of the compounds may be injected or sprayed into the heated reaction zone.

The thermal decomposition can be performed at any temperatures capable of splitting the aliphatic acids into their anhydrides. Usually temperatures between about 300° C. and 900° C. are very suitable, temperatures between about 600° C. and 800° C. being particularly useful.

The aliphatic acids may with advantage be preheated to a temperature approximately equal to or approaching the reaction temperature prior to subjecting them to the thermal decomposition, especially in cases where vapors of the aliphatic acids are to be decomposed. Such preheating may be performed in any convenient manner.

The invention may be applied to the manufacture of aliphatic anhydrides generally. Thus acetic anhydride may readily be made from acetic acid, while homologues thereof can be produced by decomposition of the corresponding acids, e. g. propionic anhydride can readily be produced by treatment of propionic acid. Moreover, the invention may be applied to the treatment of substituted fatty acids to produce the corresponding anhydrides, e. g. by treatment of alkoxy fatty acids, such for instance as methoxyacetic acid, the corresponding alkoxy aliphatic anhydrides can readily be produced by means of the invention.

The following examples are given in order to illustrate the invention, but are not to be understood as in any way limiting it.

Example 1

Acetic acid is vaporized and preheated to a temperature of 500° C.; it is then passed through a molten bath, comprising sodium chloride and potassium chloride in approximately equal proportions and potassium barium tetrametaphosphate in amount equal to about 10% of the mixed chlorides, and heated to about 700° C. The acetic anhydride formed may be worked up in any convenient way.

Example 2

A concentrated solution of sodium tungstate and disodium hydrogen phosphate is rendered neutral by the addition of acetic acid and broken pumice or other filling material impregnated therewith; by treating the mass so formed with a warm solution of barium chloride a complex barium phosphotungstate is precipitated on the pumice. The catalytic mass thus prepared, if desired after removal of sodium chloride therefrom, for example by washing with water, is heated to about 600° C. and propionic acid vapor, which has been preheated to about 550° C. is passed over it; the vapors leaving the reaction zone contain a considerable proportion of propionic anhydride, which may be separated in any convenient way.

Example 3

Nickel phosphomolybdate, prepared by treating nickel phosphate with molybdic oxide, is heated for some hours to 200° C., and the anhydrous salt thus obtained is introduced in the form of a fine suspension into glacial or substantially glacial acetic acid, to yield a mixture containing 2% by weight of the phosphomolybdate. The acid is preheated under a pressure of 10 atmospheres to 200° C. and is injected as a fine spray into a reaction chamber lined with copper and heated to about 700° C. the pressure inside the chamber being maintained at substantially 1 atmosphere. The vapors leaving the reaction chamber contain considerable quantities of acetic anhydride, which may be separated in any convenient way.

What I claim and desire to secure by Letters Patent is:—

1. Process for the manufacture of aliphatic anhydrides, which comprises thermally decomposing aliphatic acids in the presence of a catalyst comprising a phosphoric acid in combination with a plurality of metals at least one of which is at least as electronegative as barium and another of which is at least as electropositive as magnesium.

2. Process for the manufacture of lower aliphatic anhydrides, which comprises thermally decomposing lower aliphatic acids in the presence of a catalyst comprising a phosphoric acid in combination with a plurality of metals at least one of which is at least as electronegative as barium and another of which is at least as electropositive as magnesium.

3. Process for the manufacture of acetic anhydride, which comprises thermally decomposing acetic acid in the presence of a catalyst comprising a phosphoric acid in combination with a plurality of metals at least one of which is at least as electronegative as barium and another of which is at least as electropositive as magnesium.

4. Process for the manufacture of acetic anhydride, which comprises thermally decomposing acetic acid in the presence of an anhydrous catalyst comprising a phosphoric acid in combination with a plurality of metals at least one of which is at least as electronegative as barium and another of which is at least as electropositive as magnesium.

5. Process for the manufacture of acetic anhydride, which comprises thermally decomposing acetic acid in the presence of a catalyst comprising a phosphoric acid in combination with a plurality of metals at least one of which is at least as electronegative as barium and another of which is at least as electropositive as magnesium.

6. Process for the manufacture of acetic anhydride, which comprises thermally decomposing acetic acid in the presence of a catalyst comprising a plurality of metals, at least one of which is at least as electronegative as barium, and at least one of which is present as an acid radicle, combined with a phosphoric acid.

7. Process for the manufacture of acetic anhydride, which comprises thermally decomposing acetic acid in the presence of a catalyst comprising a polymetaphosphate comprising a plurality of metals at least one of which is at least as electronegative as barium.

8. In a process for the manufacture of acetic anhydride, the step of passing acetic acid through a molten bath comprising a catalyst which comprises a phosphoric acid in combination with a plurality of metals at least one of which is at least as electronegative as barium and another of which is at least as electropositive as magnesium.

9. In a process for the manufacture of acetic anhydride, the step of passing acetic acid in contact with a catalyst comprising a phosphoric acid in combination with a plurality of metals at least one of which is at least as electronegative as barium and another of which is at least as electropositive as magnesium and employed in association with an inert carrier.

10. In a process for the manufacture of acetic anhydride, the step of injecting into a heated reaction zone in a finely divided form acetic acid containing a catalyst which comprises a phosphoric acid in combination with a plurality of metals at least one of which is at least as electronegative as barium and another of which is at least as electropositive as magnesium.

11. Process for the manufacture of acetic anhydride which comprises passing acetic acid at a temperature between 600° and 800° C. in contact with a catalyst comprising a phosphoric acid in combination with a plurality of metals at least one of which is at least as electronegative as barium and another of which is at least as electropositive as magnesium.

12. Process for the manufacture of acetic anhydride which comprises preheating acetic acid and passing it in contact with a catalyst comprising a phosphoric acid in combination with a plurality of metals at least one of which is at least as electronegative as barium and another of which is at least as electropositive as magnesium.

13. Process for the manufacture of acetic anhydride which comprises vaporizing acetic acid, preheating the vapor, and passing it at a temperature between 600° and 800° C. in contact with a catalyst comprising a phosphoric acid in combination with a plurality of metals at least one of which is at least as electronegative as barium and another of which is at least as electropositive as magnesium.

14. Process for the manufacture of acetic anhydride which comprises vaporizing acetic acid, preheating the vapor, passing it at a temperature between 600° and 800° C. in contact with a catalyst comprising phosphoric acid in combination with a plurality of metals at least one of which is at least as electronegative as barium and another of which is at least as electropositive as magnesium, and separating the acetic anhydride from the water vapor before condensation of the latter.

HENRY DREYFUS.